May 15, 1951 R. F. CASTEEL 2,553,079
HEATED PRIMER FOR INTERNAL-COMBUSTION ENGINES
Filed Dec. 6, 1949 2 Sheets-Sheet 1
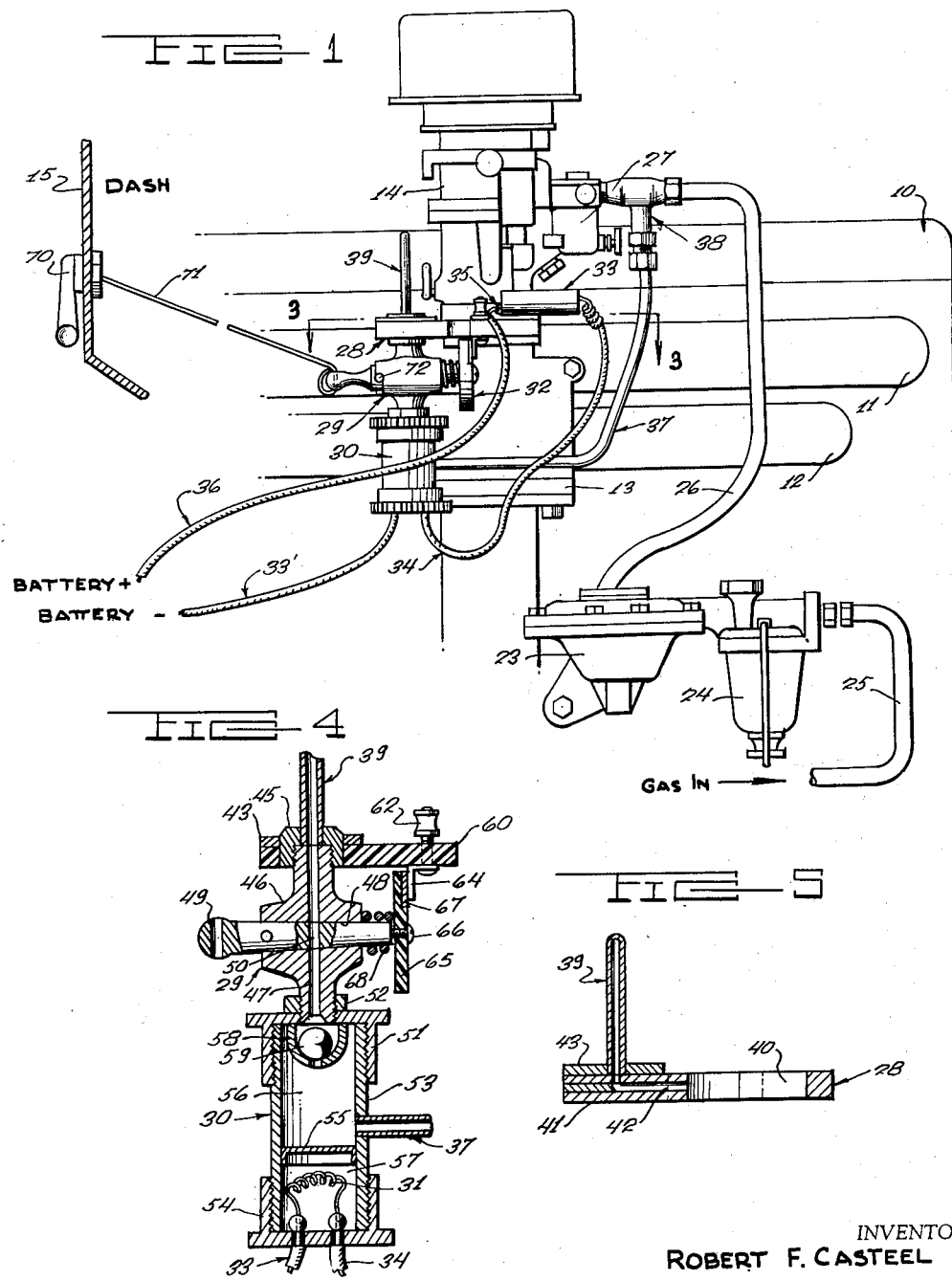
INVENTOR
ROBERT F. CASTEEL
BY
McMorrow, Berman & Davidson
ATTORNEYS

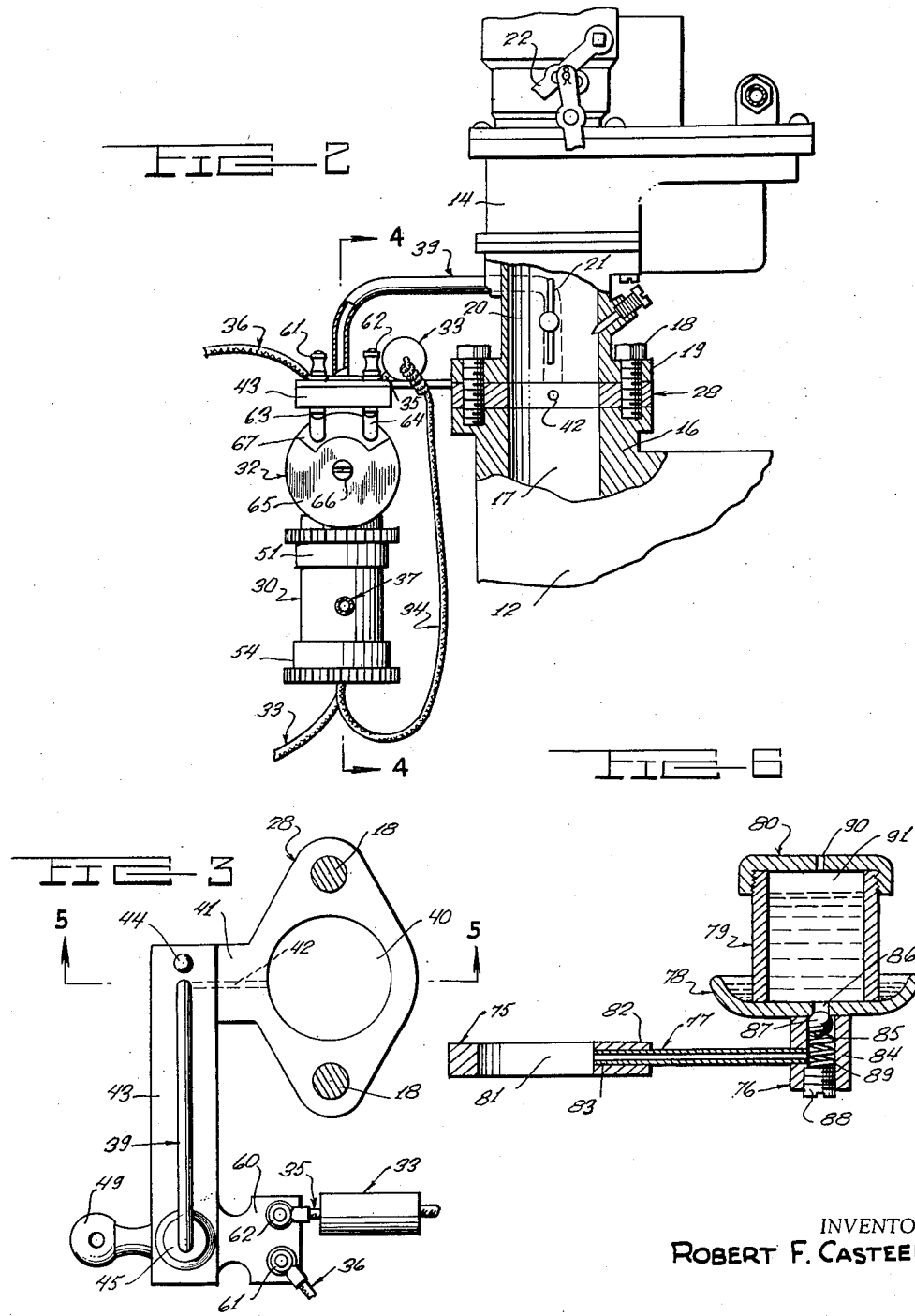

Patented May 15, 1951

2,553,079

UNITED STATES PATENT OFFICE 2,553,079

HEATED PRIMER FOR INTERNAL-COMBUSTION ENGINES

Robert F. Casteel, Ames, Iowa

Application December 6, 1949, Serial No. 131,272

6 Claims. (Cl. 123—187.5)

This invention relates to an internal combustion engine primer, and more particularly to a primer in which a small quantity of engine fuel, such as gasoline, can be heated and from which the heated fuel can be supplied to the engine to facilitate starting of the engine under cold weather conditions.

It is among the objects of the invention to provide a primer for vehicle engines which primer can be conveniently mounted on the engine and connected to the engine intake manifold with no material modification of the engine or manifold construction, which constitutes a unitary device operatively installed by merely inserting an adapter between the engine carburetor and intake manifold and, in some cases, connecting the primer to the fuel supply line and electrical system of the vehicle in which the engine is mounted, which is effective to heat and supply to the engine a quantity of engine fuel sufficient to normally cause the engine to start in extremely cold weather, which is simple and durable in construction and does not create any additional fire hazard in the operation of the engine, and which is economical to manufacture and easy to use.

Other objects and advantages will become apparent from a consideration of the following description and the appended claims in conjunction with the accompanying drawings wherein:

Figure 1 is a side elevation of a fragmentary portion of an internal combustion engine showing the engine carburetor and the intake manifold and a primer illustrative of the invention operatively assembled therewith;

Figure 2 is an elevation of the carburetor, intake manifold and primer assembly illustrated in Figure 1, with the assembly rotated 90-degrees from the position illustrated in Figure 1, and portions broken away and shown in cross section to better illustrate the construction thereof;

Figure 3 is a cross section on a somewhat enlarged scale on the line 3—3 of Figure 1;

Figure 4 is a cross section on the line 4—4 of Figure 2;

Figure 5 is a cross section on the line 5—5 of Figure 3; and

Figure 6 is a medial cross section of a somewhat modified form of engine primer illustrative of the invention.

With continued reference to the drawings, the engine and vehicle components illustrated in Figures 1 and 2 include an internal combustion engine 10, an engine exhaust manifold 11, an engine intake manifold 12, an intake heater unit 13 connected between the exhaust manifold 11 and the intake manifold 12, a down-draft carburetor 14 mounted on the intake manifold, and a vehicle dash or instrument panel 15. As particularly illustrated in Figure 1, the intake manifold 12 is provided with a flanged boss 16 on its upper side and substantially at its mid-length location which boss surrounds the fuel mixture passage 17 in the intake manifold, and is provided around this passage with screw holes for the carburetor attachment screws 18. The carburetor is provided on its lower end with an external annular flange 19 which surrounds the fuel mixture passage 20 in the carburetor and is provided with screw holes for the carburetor attachment screws 18. When the carburetor is operatively mounted on the intake manifold, as illustrated, the fuel mixture passage 20 in the carburetor is in alignment with the fuel mixture passage 17 in the intake manifold. The carburetor is provided with a throttle valve 21 in the passage 20, with a choke valve 22 in its air intake passage, and with the usual fuel jet, idling mixture adjustment and economizer components.

A fuel pump 23 is mounted on and driven by the engine 10 and is connected through a fuel filter 24 and conduit 25 with a fuel reservoir, such as the gasoline tank of a vehicle. A conduit 26 leads from the outlet side of the fuel pump to the float chamber 27 of the carburetor for supplying fuel to the carburetor. Ordinarily the fuel pump supplies fuel to the carburetor at a pressure of between 2½ and 3 pounds per square inch.

As the engine, carburetor, fuel pump and other standard accessories are of well known construction, a more detailed description is considered unnecessary for the purposes of the present disclosure.

The engine priming assembly of the invention, in the form illustrated in Figures 1 to 5 inclusive, comprises, in general, a flat metal pad or insert 28 insertable between the carburetor and the intake manifold of the engine, a valve 29 dependingly supported from the insert 28, a combined fuel reservoir and heater 30 dependingly supported by the valve 29 and including an electric heating coil 31, a switch 32 carried by the valve 29 for operation by the latter, a current regulating, resistance coil or rheostat mounted on the insert 28, an electrical conductor 33' connected to one end of the heating coil 31 and connectable to a source of electrical energy, such as a storage battery, an electrical conductor 34 connecting the opposite end of the heating coil 31 to one end of the current regulating device 33, a conductor 35 connecting the opposite end of the current regulating device 33 to one side of the switch 32 and an electrical conductor 36 connected to the opposite side of the switch 32 and connectable to the opposite pole of the storage battery, a conduit 37 extending from the fuel reservoir 30 and connectable through a T fitting 38 into the fuel supply line or conduit 26 and a conduit 39 communicating with the fluid conduit through the valve 29 and leading from the valve through the insert 28 to the interior of the intake manifold of the engine. The resistance 33 is connected in series with the heating coil 31 to protect this coil against excessive current.

The insert or pad 28 is a flat metal body, preferably formed of aluminum or some similar material and has flat substantially parallel opposite faces and a plane form shape substantially the same as the shape of the upper end of the intake manifold boss 16. This insert has apertures therethrough receiving the carburetor attachment screws 18 and has between these apertures a large aperture 40 of substantially the same size as the fuel mixture passages 17 and 20 in the intake manifold and carburetor and constituting a continuation of these passages through the insert. As mentioned above, this insert is disposed between the carburetor and the intake manifold, as is clearly illustrated in Figure 2, and is secured in position by the carburetor attachment bolts 18. An extension 41 projects laterally from one side of the insert 28 and a channel 42 leads through this extension from one exterior surface of the extension into the aperture 40.

A rectangular bar 43 is secured at one end to the insert extension 41 by a suitable means, such as the rivet 44, and extends substantially perpendicularly from the extension 41 to one side of the latter and parallel to the planes of the opposite faces of the extension. Near its opposite end this bar 43 is provided with an aperture and an inverted internally screw threaded cap 45 is secured in this aperture and receives the externally screw threaded upper end portion of the body 46 of the valve 29. The valve body is also externally screw threaded at its lower end and a fluid passage 47 extends through the valve body between its upper and lower ends. This fluid passage is intercepted, substantially at its mid-length location by a tapered bore 48 and a tapered valve plug 49 is rotatably mounted in the bore 48 and has a transverse passage 50 therethrough which passage is in alignment with the passage 47 when the plug is in its operative position corresponding to the open position of the valve, and interrupts the passage 47 when the valve plug is in a valve closing position.

The fuel reservoir and fuel heater assembly 30 comprises a hollow, inverted cap 51 having on its end wall an apertured, internally screw threaded boss 52 which receives the screw threaded lower end portion of the valve body 46, a hollow cylindrical body 53 externally screw threaded at its opposite ends and threaded at its upper end into the cap 51, and a hollow internally screw threaded cap 54 threaded onto the opposite or lower end of the body 53 and having two spaced apart apertures in its end wall. A transverse partition 55 in the body 53 intermediate the length of the latter divides the body into an upper fuel reservoir chamber 56 and a lower heating chamber 57. The heating coil 31 is mounted in the heating chamber 57 and the electrical conductors 33 and 34 extend respectively through the apertures in the end wall of the cap 54 and are connected to the respectively opposite ends of the heating coil 31.

The conduit 37 has one end secured in an aperture in the wall of the body 53 above the partition 55 so that it communicates with the fuel reservoir chamber 56 and has its other end connected to one leg of the T fitting 38, the other two legs of which are connected into the fuel supply line 26 leading from the fuel pump to the carburetor. With this arrangement, the fuel reservoir chamber will be maintained full of engine fuel by the fuel pump.

The conduit 39 is a substantially U-shaped tube which extends longitudinally of and somewhat above the bar 43 and has one end secured in the inverted cap 45 in communication with the fluid passage 47 through the valve and its opposite end secured in an aperture in the bar 43 and communicating with the passage 42, as is clearly illustrated in Figure 5.

With this arrangement, when the valve plug 49 is in valve opening position, engine fuel may be forced by the fuel pump 23 through the conduit 37, the fuel reservoir chamber 56, the valve 29, the conduit 39, and the passage or channel 42 into the aperture 40 in the insert 28 and thus into the intake manifold passage 17.

A ball valve cage 58 is secured to the end wall of the cap 51 within the fuel reservoir chamber 56 and a ball 59 in this cage acts as a check valve to prevent a back fire in the engine from driving the fuel in the fuel reservoir back through the conduit 37 into the pump or carburetor and also to prevent excessive vaporization of the fuel in the chamber 56 while the engine is not being cranked.

The switch 32 comprises a switch plate 60 of electrically insulative material secured to the bar 43 by the inverted cap 45 and projecting outwardly from one side of the bar. This plate carries a pair of spaced apart terminals 61 and 62 and switch contacts 63 and 64 are connected to the terminals 61 and 62 respectively at the lower side of the base plate 60 and extend downwardly from the base plate. A circular disc 65 of electrically insulative material is provided with a central aperture and secured to the smaller end of the valve plug 49 by a cap screw 66 extending through the aperture in the disc and threaded into the end of the valve plug. A switch plate 67 is carried by this disc in position to simultaneously engage both of the switch contacts 63 and 64, as illustrated in Figure 2, when the disc is in one rotational position relative to the contacts. The disc 65 is mounted on the plug 49 in a position such that the contacts 63 and 64 are bridged and the switch closed only when the plug is in its valve opening position, as illustrated in Figure 4. The conductor 35 is connected to the terminal 62 and the conductor 36 is connected to the terminal 61 of the switch 32.

A compression spring 68 surrounds the smaller end of the valve plug 49 between the valve body 46 and the disc 65 to maintain the valve plug firmly seated in the tapered bore 48 of the valve body.

A manually operated knob or lever 70 is rotatably mounted upon and extends through the dash or instrument panel 15 of the vehicle and a rod 71 connects this lever 70 to the larger end of the valve plug 49. The valve body 46 is recessed at the larger end of the bore 48 through an angular extent of approximately 90° and a pin 72 projecting from the valve plug 49 travels in this recess and provides a limit stop for rotational movement of the valve plug in both the valve opening and valve closing positions of the latter.

With this arrangement, when the knob or lever 70 is manually turned to turn the valve plug 49 to its valve opening position, the disc 65 is simultaneously turned to close the switch 32 and heating current is thereby applied to the heating coil 31 heating the body of fuel in the fuel reservoir chamber 56. After a short time, from one to two minutes for example, the fuel in the chamber 56 will be sufficiently heated and the engine starter is then operated to crank the engine. With the valve 49 open the heated fuel will then be forced by the fuel pump and drawn by the intake manifold vacuum into the engine intake manifold in the manner indicated above, and from thence into the engine cylinders where it will retain sufficient heat to form an explosive mixture in the cylinders. If the engine should back fire during this starting operation the check valve including the cage 58 and ball 59 will prevent the force of such an explosion from disrupting the fuel line connections or forcing sufficient fuel from the carburetor into the engine to flood the engine. After the engine has started the valve plug 49 is turned to its valve closing position thereby opening the switch 32 and discontinuing the heating of the fuel in the fuel reservoir 56.

The modified form of the invention illustrated in Figure 6 is especially provided for such engines as farm tractor engines and stationary engines and includes, in general, a flat insert 75, a check valve 76, a conduit 77 connecting the check valve to the insert 75, a saucer-shaped burner 78 mounted on the check valve, a hollow body 79 mounted on the burner and a screw cap 80 for the body 79.

The insert 75 is formed of a suitable material, such as aluminum, and has substantially parallel opposite faces and a shape corresponding to the shape of the upper end of an intake manifold boss, such as the boss 16 of the manifold 12 illustrated in Figure 2. This pad or insert has apertures for receiving the carburetor attaching screws 18 and a fuel mixture passage aperture 81 therethrough. An extension 82 projects from one side of the insert 75 and is provided with a fuel passage 83 and the conduit 77 is secured at one end in the extension 82 and communicates with the passage 83. The check valve 76 includes a hollow body 84 having an aperture in its wall receiving the opposite end of the conduit 77 and having a longitudinally extending bore 85 therethrough. The burner 78 is provided with an aperture 86 which is centered on the axis of the bore 85 and a valve ball 87 is disposed in the bore 85 in position to contact the lower side of the burner and close the aperture 86. A screw plug 88 is threaded into the lower end of the bore 85 and a weak compression spring 89 is disposed in the bore between the plug 88 and the ball 87 to resiliently urge the ball into closing relationship with the aperture 86.

The hollow body 79 is preferably of cylindrical shape and is secured at its lower end to the upper side of the saucer-shaped burner 78 substantially coaxial with the bore 85 and aperture 86. This body is of sufficient size to contain a quantity of fuel sufficient to normally start the engine under cold weather conditions and is externally screw threaded at its upper end to receive the internally screw threaded flanged cap 80. The cap 80 has a vent opening 90 therethrough for admission of air into the fuel reservoir chamber 91 provided by the hollow interior of the body 79.

The check valve 76, burner 78, body 79 and cap 80 are supported from the insert 75 by the conduit 77 so that the device comprises a unitary structure which can be installed on the engine without any modification of the engine by merely disposing the insert 75 between the intake manifold and the carburetor of the engine.

In using the device, the portion of the saucer-shaped burner 78 surrounding the body 79 is filled with engine fuel and ignited. The body 79 is heated by the burning of this fuel and after all of the fuel in burner 78 has been consumed, body 79 is filled with engine fuel and the cover 80 threaded on. After a time interval sufficient for the heat imparted to the body 79 to have heated the fuel in this body, the engine is cranked and the intake manifold vacuum of the engine will open the check valve and draw the heated fuel through the check valve and the conduit 77 into the intake manifold of the engine. The check valve retains the fuel in the fuel reservoir between the time the fuel is placed in the reservoir and the cranking of the engine is begun.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An internal combustion engine primer assembly comprising a flat insert disposable between an engine carburetor and intake manifold and having apertures therethrough for receiving the carburetor attachment bolts and for continuing the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, and heating means for said reservoir supported by said insert extension in operative association with said reservoir.

2. An internal combustion engine primer assembly comprising a flat insert disposable between an engine carburetor and intake manifold and having apertures therethrough for receiving the carburetor attachment bolts and for continuing the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, and heating means for said reservoir supported by said insert extension in operative association with said reservoir, said fuel reservoir comprising an elongated hollow body having a partition intermediate its length providing a pressure chamber at one side of said partition, and said heating means comprising an electrically heated coil disposed in said body at the opposite side of said partition.

3. An internal combustion engine primer assembly comprising a flat insert disposable between an engine carburetor and intake manifold and having apertures therethrough for receiving the carburetor attachment bolts and for continuing the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, and heating means for said reservoir supported by said insert extension in operative association with said reservoir, said heating means comprising a saucer-shaped burner, and said fuel reservoir comprising a hollow body secured at one end to said burner at the concave side of the latter, and a screw cap threadable onto the opposite end of said body.

4. An internal combustion engine primer assembly comprising a flat insert disposable between an engine carburetor and intake manifold and having apertures therethrough for receiving the carburetor attachment bolts and for continuing the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, heating means for said reservoir supported by said insert extension in operative association with said reservoir, said heating means comprising a saucer-shaped burner, and said fuel reservoir comprising a hollow body secured at one end to said burner at the concave side of the latter, a screw cap threadable onto the opposite end of said body, and a valve interposed between said reservoir and the channel in said insert for retaining fuel in said reservoir until an engine cranking operation is begun.

5. An internal combustion engine primer assembly comprising a flat insert disposable between an engine carburetor and intake manifold and having apertures therethrough for receiving the carburetor attachment bolts and for connecting the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, heating means for said reservoir supported by said insert extension in operative association with said reservoir, and a manually operated valve interposed between said fuel reservoir and said insert.

6. An internal combustion engine primer assembly comprising a flat insert disposable between an engine carburetor and intake manifold and having apertures therethrough for receiving the carburetor attachment bolts and for connecting the fuel mixture passage from the carburetor to the intake manifold, said insert having a laterally projecting extension on one side thereof and a channel leading from one surface of said extension into the fuel mixture passage aperture in said insert, a fuel reservoir supported from said insert extension and having a capacity for a sufficient amount of fuel to facilitate starting the engine under cold weather conditions, conduit means connecting said reservoir to said channel, heating means for said reservoir supported by said insert extension in operative association with said reservoir, a manually operated valve interposed between said fuel reservoir and said insert, and a heater controlling electric switch operated by said valve for respectively energizing and deenergizing said heater when said valve is turned on and off.

ROBERT F. CASTEEL.

REFERENCES CITED

The following references are of record in the file of this patent:

UNITED STATES PATENTS

| Number | Name | Date |
|---|---|---|
| 1,365,755 | Waterhouse | Jan. 18, 1921 |

FOREIGN PATENTS

| Number | Country | Date |
|---|---|---|
| 7,476 | Great Britain | of 1915 |
| 438,769 | Great Britain | of 1935 |
| 446,401 | Great Britain | of 1936 |